US009544635B2

United States Patent
Das Busek et al.

(10) Patent No.: US 9,544,635 B2
(45) Date of Patent: Jan. 10, 2017

(54) SYSTEM AND METHOD FOR OPTIMIZING MEMORY USAGE IN A UNIVERSAL CONTROLLING DEVICE

(71) Applicant: UNIVERSAL ELECTRONICS INC., Santa Ana, CA (US)

(72) Inventors: Naimisaranya Das Busek, Los Angeles, CA (US); Thomas Henley, Costa Mesa, CA (US)

(73) Assignee: Universal Electronics Inc., Santa Ana, CA (US)

( * ) Notice: Subject to any disclaimer, the term of this patent is extended or adjusted under 35 U.S.C. 154(b) by 142 days.

(21) Appl. No.: 14/209,114

(22) Filed: Mar. 13, 2014

(65) Prior Publication Data

US 2014/0266640 A1   Sep. 18, 2014

Related U.S. Application Data

(60) Provisional application No. 61/788,561, filed on Mar. 15, 2013.

(51) Int. Cl.
  *G08B 21/00* (2006.01)
  *H04N 21/422* (2011.01)
  *G08C 17/00* (2006.01)
  *G06F 9/445* (2006.01)

(52) U.S. Cl.
  CPC .......... *H04N 21/42226* (2013.01); *G06F 8/65* (2013.01); *G08C 17/00* (2013.01); *H04N 21/42225* (2013.01); *G08C 2201/21* (2013.01); *G08C 2201/92* (2013.01)

(58) Field of Classification Search
  CPC . G08C 17/00; G08C 2201/21; G08C 2201/92; H04N 21/42225; H04N 21/42226
  See application file for complete search history.

(56) References Cited

U.S. PATENT DOCUMENTS

| 4,703,359 | A | 10/1987 | Rumbolt et al. |
| 4,959,810 | A | 9/1990 | Darbee et al. |
| 5,255,313 | A | 10/1993 | Darbee |
| 5,552,917 | A | 9/1996 | Darbee et al. |
| 5,614,906 | A | 3/1997 | Hayes et al. |
| 6,055,632 | A | 4/2000 | Deegan et al. |
| 6,650,247 | B1 * | 11/2003 | Hayes ............... H04B 10/1141 340/12.23 |

(Continued)

OTHER PUBLICATIONS

ISA/US, International Search Report and Written Opinion issued on PCT Application No. PCT/US14/18583, mailed on Jul. 29, 2014, 9 pages.

(Continued)

*Primary Examiner* — Mark Rushing
(74) *Attorney, Agent, or Firm* — Greenberg Traurig, LLP

(57) ABSTRACT

A method for optimizing memory usage in a device having a universal controlling application includes receiving into the device data for use in configuring the universal controlling application wherein the data is used to identify from within a library of command code sets stored in a memory of the device a command code set that is appropriate for use in commanding functional operations of the appliance and causing a non-identified one or more of the command code sets of the library of command code sets stored in the memory of the device to be discarded to thereby create freed space in the memory of the device.

6 Claims, 5 Drawing Sheets

(56) References Cited

U.S. PATENT DOCUMENTS

| | | | |
|---|---|---|---|
| 6,650,248 | B1 | 11/2003 | O'Donnell et al. |
| 7,339,513 | B1 | 3/2008 | Provis et al. |
| 7,907,222 | B2 | 3/2011 | Haughawout et al. |
| 8,031,270 | B1 | 10/2011 | Wisniewski et al. |
| 2002/0101358 | A1* | 8/2002 | De Bolster ............ G08C 19/28 340/12.22 |
| 2002/0170952 | A1 | 11/2002 | Alsafadi et al. |
| 2003/0103088 | A1* | 6/2003 | Dresti ................... G06F 3/0481 715/835 |
| 2003/0164787 | A1 | 9/2003 | Hayes |
| 2004/0125080 | A1 | 7/2004 | Ha et al. |
| 2004/0263317 | A1* | 12/2004 | Hwang ................... B60R 25/24 340/5.24 |
| 2005/0068222 | A1 | 3/2005 | Krzyzanowski et al. |
| 2006/0090032 | A1 | 4/2006 | Franklin et al. |
| 2006/0200538 | A1 | 9/2006 | Yuh et al. |
| 2009/0322583 | A1* | 12/2009 | Reams ................... G08C 19/28 341/176 |
| 2010/0058316 | A1 | 3/2010 | Ha et al. |
| 2011/0252071 | A1 | 10/2011 | Cidon |
| 2011/0302619 | A1 | 12/2011 | Hale et al. |
| 2012/0112715 | A1 | 5/2012 | Tong et al. |
| 2012/0295662 | A1 | 11/2012 | Haubrich |

OTHER PUBLICATIONS

ISA/US, International Search Report and Written Opinion issued on PCT Application No. PCT/US14/27667, mailed on Aug. 13, 2014, 13 pages.

ISA/US, International Search Report and Written Opinion issued on PCT Application No. PCT/US14/27745, mailed on Aug. 13, 2014, 15 pages.

European Patent Office, extended European Search Report issued on EP patent application No. 14771058.6, dated Feb. 10, 2016, 7 pages.

* cited by examiner

SYSTEM AND METHOD FOR OPTIMIZING MEMORY USAGE IN A UNIVERSAL CONTROLLING DEVICE

RELATED APPLICATION INFORMATION

This application claims the benefit of U.S. Provisional Application No. 61/788,561, filed on Mar. 15, 2013, the disclosure of which is incorporated herein in its entirety.

BACKGROUND

This invention relates generally to remote control systems and, more particularly, to systems and methods for optimizing memory usage in a universal controlling device.

Manufacturers typically provide a remote control with an appliance and, as such, different appliance types of different manufacturers are often commanded with different remote controls. To minimize the number of individual remote controls a user requires, universal controlling devices have been developed. In this regard, universal controlling devices having a library of command codes for commanding various functional operations of various types of appliances of various manufacturers are well known. By way of example only, universal controlling devices are described in commonly assigned U.S. Pat. Nos. 4,959,810, 5,255,313, 5,552,917, and 7,907,222, each of which is incorporated herein by reference in its entirety.

The command codes for controlling functional operations of appliances of various types and various manufacturers, i.e., a library or set of command codes, are often prestored in the memory of the universal controlling device. The user then interacts with the universal controlling device to identify to the universal controlling device which appliance(s) the user desires to control, i.e., the user manually enters an appliance or brand code, usually obtained from a tabulation in a printed user manual or the like, into the universal controlling device and the universal controlling uses that user provided identity information to access those preprogrammed codes that are appropriate for controlling functional operations of the identified appliance(s). In this regard, examples of known methods for performing an initial setup of a universal controlling device may be found in, for example, the above mentioned U.S. Pat. Nos. 4,959,810 and 7,907,222 as well as U.S. Pat. No. 5,614,906, entitled "Method for Selecting a Remote Control Command Set," and U.S. Pat. No. 4,703,359 entitled "Universal Remote Control Unit with Model Identification Capability," each of which is incorporated herein by reference in its entirety. An additional system and method for setting up a universal remote control is also disclosed in U.S. Pat. No. 6,650,248.

SUMMARY

While known setup methods do work for their intended purpose, the following describes exemplary systems and methods for optimizing the usage of memory within a universal controlling device, particularly upon configuration of a universal controlling device. The following also describes exemplary systems and methods for distributing command code sets to one or more devices in a home theater environment. Still further, the following describes exemplary system and method for optimizing the usage of memory to facilitate upgrades of a device having a universal controlling application.

A better appreciation of the objects, advantages, features, properties, and relationships of the systems and methods described hereinafter will be obtained from the detailed description and accompanying drawings which set forth illustrative embodiments which are indicative of the various ways in which the principles of the systems and methods may be employed.

BRIEF DESCRIPTION OF THE DRAWINGS

For use in better understanding the exemplary systems and methods described herein, reference may be had to preferred embodiments shown in the following drawings in which.

DESCRIPTION OF THE INVENTION

The following describes systems and methods for, among other things, optimizing memory usage in a universal controlling device.

Figure 1:
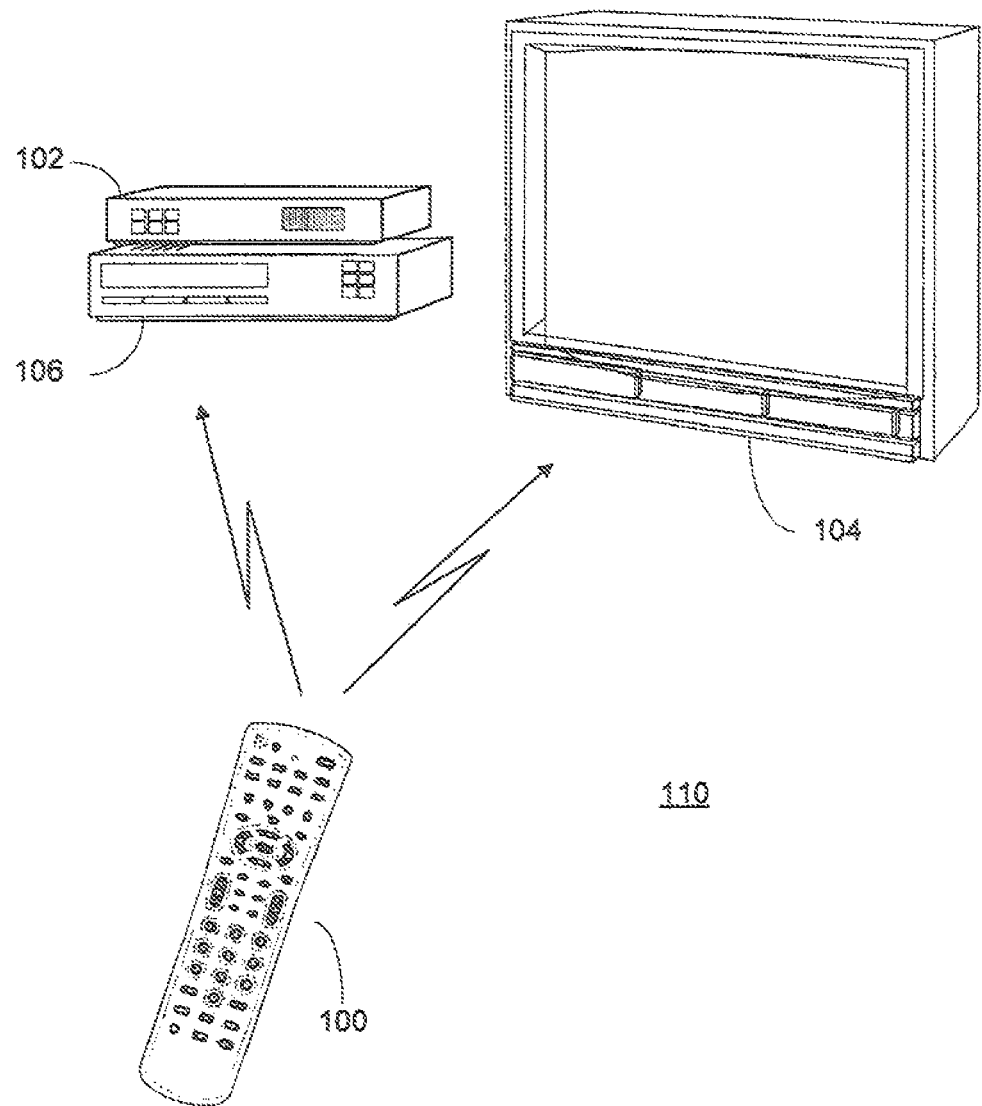
FIG. 1 illustrates an exemplary system in which the universal remote control may be used.

By way of example, FIG. 1 illustrates an exemplary system 110 wherein a universal controlling device 100 may be configured and then used to command/control functional operations of various appliances, such as the illustrated cable set top box 102, TV set 104, VCR 106, and/or the like.

Figure 2:
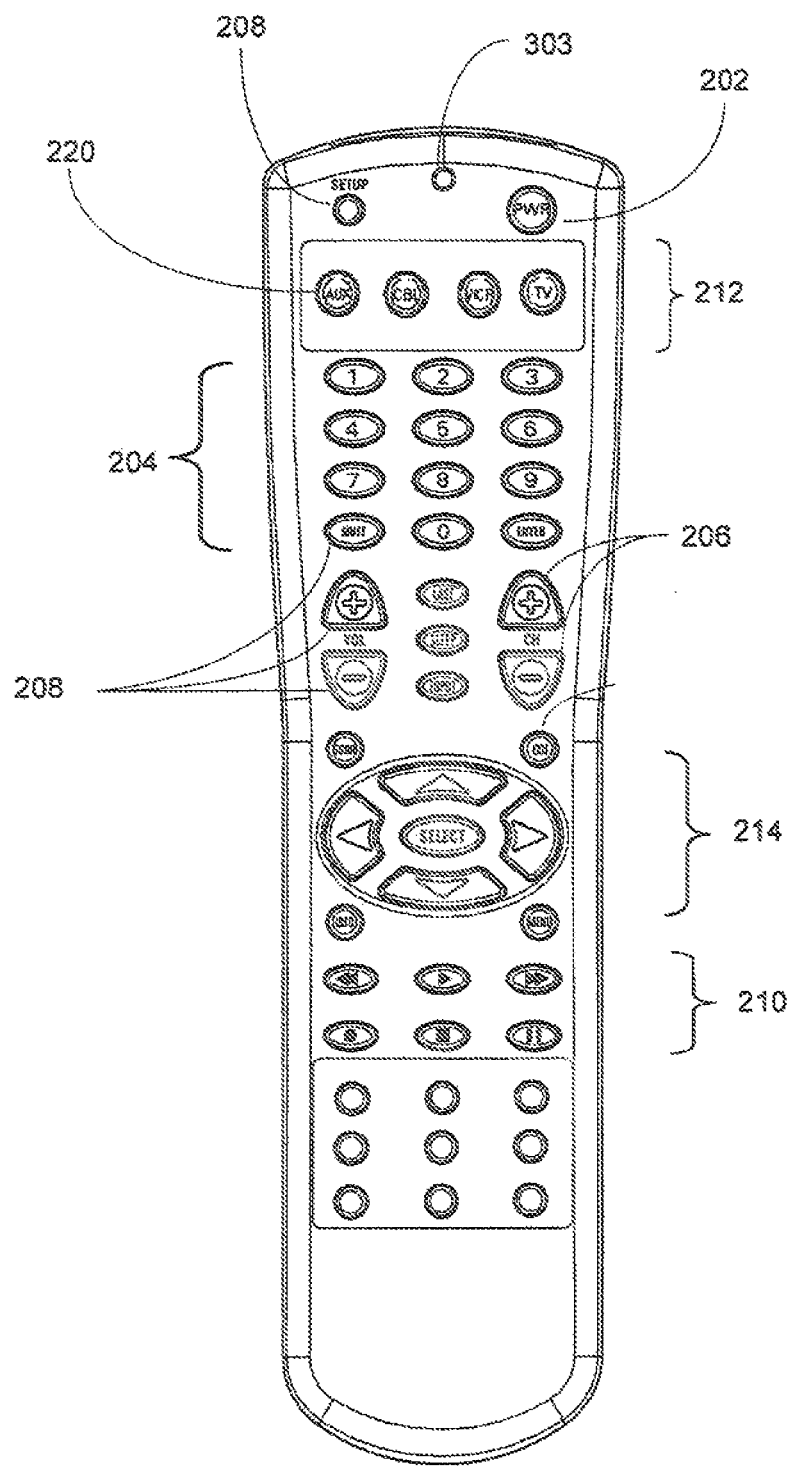
FIG. 2 illustrates a top view of an exemplary universal remote control for use in the system of FIG. 1.

For use in remotely commanding an appliance to perform an operational function, the universal controlling device 100, an example of which is illustrated in FIG. 2, includes a set of command keys within a key matrix wherein the command keys within the key matrix are each assigned to one or more operational functions. In this regard, the universal controlling device 100 has command keys for use in controlling common operational functions, i.e., functions that are usually widely supported by devices of a common device type (e.g., power 202, digit tuning 204, volume control 208, channel up/down control 206, volume up/down control 208, media transport 210, navigation 214, etc.) The universal controlling device 100 also includes mode keys 212, e.g., "AUX," "CBL," "VCR," and "TV," the activation of which places the universal controlling device 100 into a mode to transmit commands to a particular type or types of appliance. Still further, the universal controlling device 100 may include programmable keys, e.g., for assigning macro commands thereto. For configuring the universal controlling device 100, a setup key 208 is also provided. It will be appreciated that, while illustrated as hard keys, the keys of the universal remote control 100 may be implemented as soft keys, for example, by being displayed on an LCD touch screen or the like and the universal controlling device 100 could be implemented as a stand-alone remote control or as an app resident on a smart device such as a smart phone, tablet computer, or the like.

Figure 3:
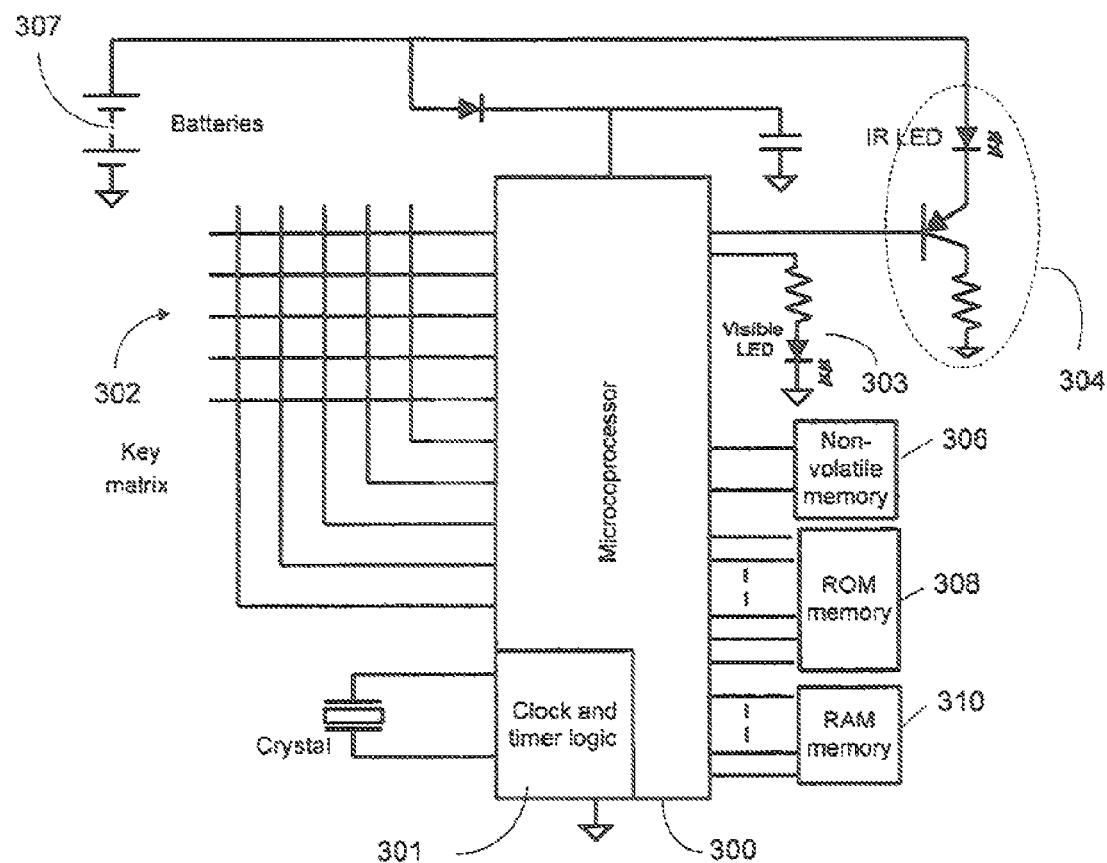
FIG. 3 illustrates a block diagram view of various components of the exemplary universal remote control of FIG. 2.

By way of further example, referring to FIG. 3, the universal controlling device 100 may include, as needed for a particular application, one or more processors 300 coupled to a memory devices (such as a ROM memory 308, a RAM memory 310, and/or non-volatile read/write memory 306), a key matrix 302 (e.g., physical buttons, a touch screen display, or a combination thereof), an internal clock and timer 301, transmission circuit(s) 304 (e.g., IR and/or RF), receiver circuit(s) and/or transceiver circuit(s) (e.g., IR and/or RF—not illustrated), a means 303 to provide visual feedback to the consumer (e.g, LED, display, and/or the like), means to provide audio feedback to the user (e.g., a speaker—not illustrated), a power supply 307, and/or a serial I/O port (e.g., a jack or contacts—not illustrated). As will be understood by those of skill in the art, the non-transitory memory device(s) include executable instructions that are intended to be executed by the processor 300 to control the operation of the universal remote control 100. In this manner, the processor 100 may be programmed to control the various electronic components within the universal controlling device 100, e.g., to monitor the power supply 307, to cause the transmission of signals, display icons and/or HTML pages, etc. The non-volatile read/write memory 306, for example, an EEPROM or the like, may be provided to store setup data and parameters as necessary such that data is not required to be reloaded after battery changes. It is to be understood that the memory devices may take the form of any type of non-transitory readable media, such as, for example, a Smart Card, memory stick, a chip, a hard disk, a magnetic disk, and/or an optical disk. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the universal controlling device 100 to perform an action, the universal controlling device 100 is adapted to be responsive to events, such as a sensed consumer interaction with the key matrix 302, receipt of a transmission, etc. In response to an event being detected appropriate instructions and/or data within the memory devices are executed and/or accessed. For example, when a command key is activated on the universal controlling device 100, the universal controlling device 100 may execute instructions that cause a code data value corresponding to the activated command key to be retrieved from a command code data set stored in the memory device and to cause the retrieved code data value to be transmitted to an intended target appliance in a format recognizable by that appliance. It will be appreciated that the instructions within the memory devices can be used not only to cause the transmission of command codes and/or data to the appliances but also to perform local operations. While not limiting, local operations that may be performed by the universal controlling device 100 include displaying information/data, favorite channel setup, macro button setup, command function key relocation, etc. Since examples of local operations can be found in U.S. Pat. Nos. 5,481,256, 5,959,751, and 6,014,092 they will not be discussed in greater detail herein for the sake of brevity.

To configure the universal controlling device 100, i.e., to identify which command code set(s) within the library of command code sets are to be used to command operational functions of one or more intended target appliances, configuration information is provided to the universal controlling device 100. Such configuration information can be provided to the universal controlling device 100 in a number of different manners such as via use of the keypad to enter an appliance code or a quick setup code, via the reading of a barcode or a RFID label, via a communication from an appliance, etc. Exemplary method for configuring the controlling device 100 to command functional operations of one or more intended target appliances are described in, by way of non-limiting example only, the incorporated U.S. Pat. Nos. 4,959,810, 7,046,161, 7,386,398, and 7,907,222.

Figure 4:
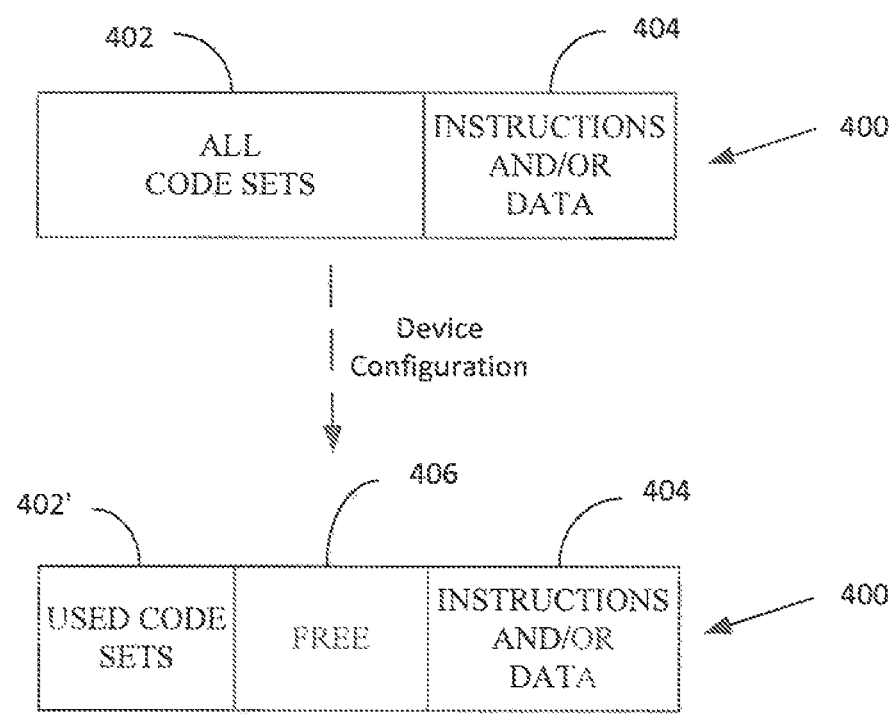
FIG. 4 illustrates an exemplary method for optimizing memory usage employed in connection with a process for configuring a universal controlling device.

Turning now to FIG. 4, in an exemplary embodiment a universal controlling device 100 is distributed with a complete library of command code sets 402 stored in one or more memory devices 400. As also illustrated, memory device 400 will also include other data and/or instructions required to make the universal controlling device 100 operable as intended. As additionally illustrated, when the universal controlling device 100 is configured to command functional operations of one or more intended target appliances those command code sets within the library of command code sets 402 that have not been selected for use as a result of the configuration process can be discarded (e.g., the data/information in the corresponding memory space can be deleted or otherwise designated as being overwritable). As a result, the memory 400 will now have free memory space 406 for use in storing further data and/or instructions in addition to the command codes set(s) selected from the library 402' as a result of the configuration process and the initially stored data and/or instructions 404 provided to make the universal controlling device 100 operable as desired. Using the now free memory space, the universal controlling device 100 can be updated with command data for commanding extended functional operations of one or more of the intended target appliances, with further GUI elements, etc. as described in U.S. Published Application No. 2006/0200538 which is incorporated herein by reference in its entirety. Similarly, the now free memory space can be updated with functionality that would be useful with the underlying device providing the universal controlling capabilities, e.g., the device ships with programming that only supports basic accelerometer-based flip detection and, after configuration of the controlling device application, sufficient space is freed for installation of programming that will support more advanced accelerometer gesture recognition. Yet further, the free memory space could be utilized to store scripts or byte code for virtual machines in advanced devices.

To provide flexibility in the event that a consumer needs to configure the universal controlling device 100 to command functional operations of a further appliance, for example an appliance being newly added to the home, the universal controlling device 100 can cause the entirety of or the un-used portions of the pre-installed library of command code sets to be sent to an appliance capable of communicating with the universal controlling device 100, such as set top box 102, for backup prior to its deletion from the memory device 400 of universal controlling device 100. This optional method for backing up the library of command code sets will be seen to be particularly useful in instances where the consumer does not have the ability to access a database of command codes from an external source of information, such as from an Internet server. The backed up library of command code sets could then be returned to the universal controlling device 100 in whole or in part as needed. In this regard, it will be appreciated that appliance configuration information could be provided to the universal controlling device 100, directly to the set top box 102, or the like to thereby cause the set top box 102 to provide to the universal controlling device 100 only that portion of the command code set library that is needed to adapt the universal controlling device 100 to command functional operations of an intended target appliance indicated by such configuration information.

In such a system, the set top box 102 could also be the source of any additional data and/or instructions that are to be installed into the memory device 400 of the universal controlling device 100 once the unneeded information in the memory device 400 has been discarded as described above. For example, once the set top box 102 receives an indication from the universal controlling device 100 that memory space has been freed, e.g., a signal indicative of the successful discarding of the unneeded command codes sets being issued to the set top box 102 from the universal controlling device 100, completion of the backup being detected by the set top box 102, or the like, the set top box 102 can transmit any such upgrade information to the universal controlling device 100 as described above. Thus, if the set top box 102 is a device that is adapted to respond to signals from the universal controlling device 100 wherein the signals are intended to have data that is indicative of motion made with the universal controlling device 100, the instructions for adapting the universal controlling device 100 to transmit such signals can be prestored on the set top box 102 and provided to the universal controlling device 100 for storage in the free memory space as described above. In this manner, individual appliances can have stored thereon any instructions that would be needed for programming the universal controlling device 100 to operate with, command, etc. any functionalities that might otherwise not be usable with the programming as originally provisioned with the universal controlling device 100. As will be appreciated, such a system allows for the provision of a base universal controlling device 100 that can be upgraded as needed with overly burdening the memory of the universal controlling device 100 with programming for supporting appliance functionalities that would not otherwise be applicable to the user's home configuration.

In the described system in which the universal controlling device 100 is adapted to bi-directionally communicate with an appliance, such as set top box 102, it is contemplated that the appliance could also be provisioned with a library of command codes sets. In this instance, the universal controlling device 100 that would be used with the set top box 102 (e.g., a universal controlling device that would be a part of a system that would be installed by a cable or satellite services provider) can then be provisioned with only those command code sets that are known to be or likely to be missing from the library of command code sets provisioned with the set top box 102, for example command code sets for televisions, DVRs, etc. that have been introduced into the market after the set top box 102 was manufactured and distributed to the service provider. To this end, the build of the library of command code sets to be provisioned in the set top box 102 would be given a first time stamp and the build of the possible library of command code sets to be provisioned in the universal controlling device 100 would be given a second time stamp. When the second time stamp is later in time than the first time stamp, the build of the library of command code sets to be provisioned in the set top box 102 would be compared to the build of the library of command codes sets to be provisioned in the universal controlling device 100 with the command codes sets found in both being removed from the build of the library of command code sets to be provisioned in the universal controlling device 100 prior to the library of command code sets being stored in the memory of the universal controlling device 100. As will be appreciated, storing in the memory of the universal controlling device 100 only a subset of a library of command code sets will likewise free space in the memory of the universal controlling device 100 which free memory space could be used for other purposes as described herein.

When the universal controlling device 100 has prestored therein only the command code sets that cannot be found in the library of command code sets provisioned to the set top box 102 with which the universal controlling device 100 is to be used, configuration of the universal controlling device 100 may require that some of the command code sets stored in the memory of the set top box 102 be transferred to the universal controlling device 100. The identification of which command code sets to transfer to the universal controlling device 100 can be performed in any of the manners previously described. In addition, it is contemplated that the command code sets prestored in the memory of the universal controlling device 100 could be transferred to other legacy controlling device (i.e., devices in need of an upgrade) either directly or by being installed in and later transferred from the set top box 102. In the latter case it will be appreciated that the set top box 102, having received command code sets from the universal controlling device 100, will thus have an updated and complete library of command code sets which is particularly useful in instances where the set top box 102 is intended to command functional operations of further appliances in a home theater system or otherwise intended to be a source of command code sets for use by other devices in the home.

In instances where a master or super-remote control is to be used to provide command codes sets for use in a consumer's universal controlling device 100 or a system which includes the universal controlling device 100 and a set top box 102, as is commonly done with professional installers, a time stamp for the library of command code sets installed in the set top box 102 could be obtained (for example by keying in a SKU, scanning a barcode, reading a RFID tag, etc.) to thereby identify which command code sets in a master library of command code sets, e.g., as stored in the master or super-remote control, are likely to be missing from the library of command codes sets installed in the set top box 102. The identified command codes sets could then be transferred to the consumer's universal controlling device 100 and/or the set top box 102 for the purposed above described. As will again be appreciated, such a system removes the need for expensive/larger memory sized remotes used for the masses, and only requires a "special SKU" or the like to be used on appliances, e.g., set top boxes, that are provided by installers. Such a system can also be used in a self-install scenario where the user has requested a Multi-room system in which there is no need for all remotes to be provided with a full library of command code sets and the concept of one super-remote, plus other controlling devices having smaller command code set memory footprints applies. Yet further, it will be appreciated that such a system allows for the pushing out of configuration changes to a set top box 102 (if the set top box in not Internet connected) through the use of controlling devices.

Figure 5:
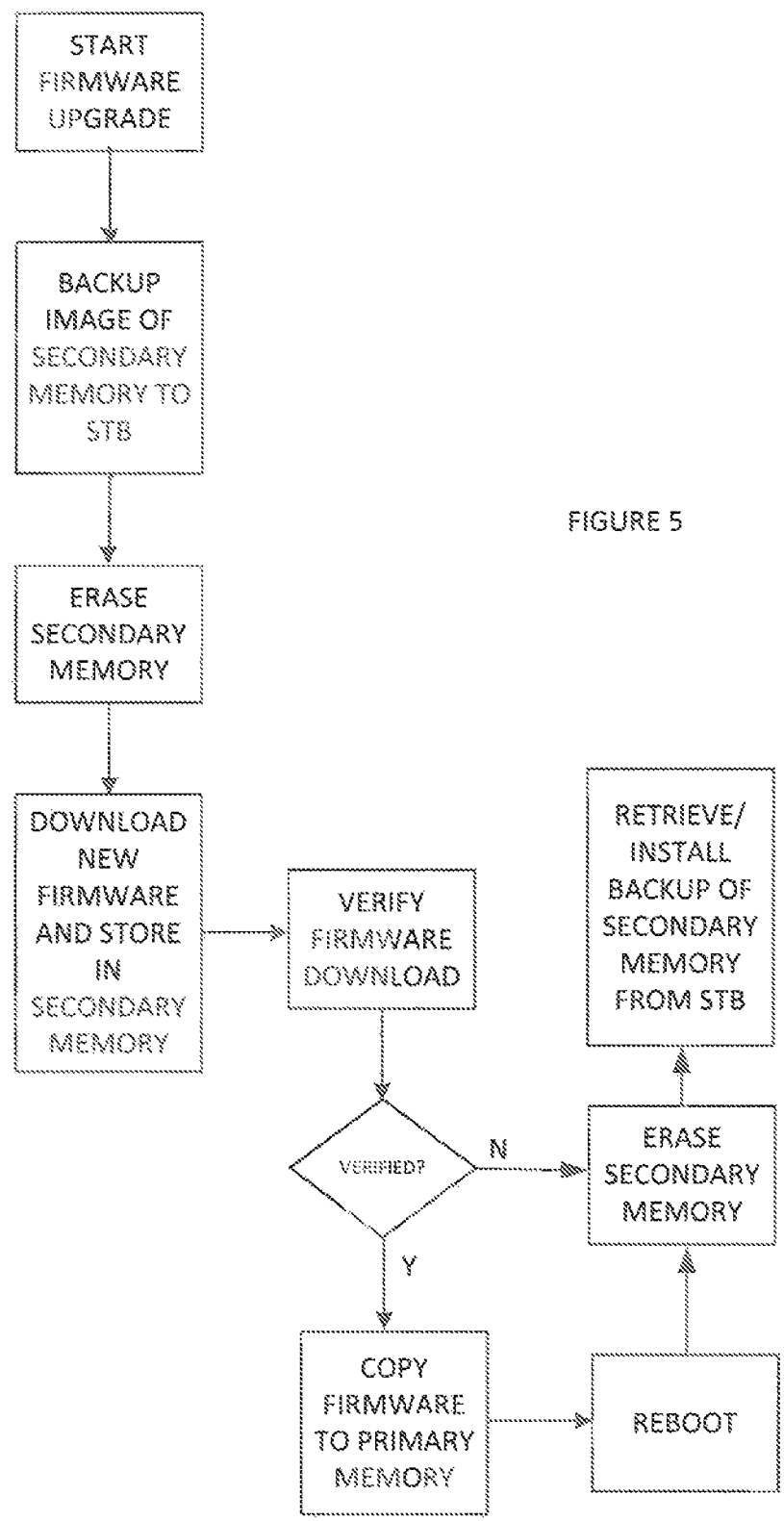
FIG. 5 illustrates an exemplary method for optimizing memory usage employed in connection with a process for upgrading a universal controlling device.

In a system design supporting over the air or the like type of firmware upgrades of the universal controlling device 100 it is usually required to maintain the current firmware image while downloading a new firmware image, and even at times to keep a golden image if all goes wrong with the device. These requirements thus make over the air firmware upgrades a less attractive option to customers. However, it is proposed that in a design of a device having co-processors each having internal nonvolatile memory, such as a device that is using a secondary chip for port expansion like a device having a MAXQ to handle QWERTY side keys, this additional memory can also be used for secondary storage during a firmware upgrade process. For example, during a firmware upgrade, memory space in the secondary chip can be freed, e.g., be erased at the beginning of the upgrade process—which would of course make the QWERTY functionality of the device in this example temporarily non-functional—after the original programming image of the secondary chip is backed-up to a target side memory so it can be retrieved after the firmware update of the main chip is done and the original firmware image or received firmware upgrade image as stored in the freed memory space is erased therefrom. For example, the downloaded firmware upgrade can be temporarily stored in the secondary memory and then be verified before being transferred to the primary memory or the original firmware can be temporarily stored in the secondary memory and erased after verification of the received firmware upgrade as stored in the primary memory. In either case, the backed-up image of the secondary memory, for example as stored in an external device such as the set top box 102, can be restored to the secondary memory after such processing. A non-limiting exemplary method for performing such an operation is illustrated in FIG. 5.

While specific embodiments of the present invention have been described in detail, it will be appreciated by those skilled in the art that various modifications and alternatives to those details could be developed in light of the overall teachings of the disclosure. For example, and as previously noted, the functionality of the universal controlling device 100 can be included in other smart devices such as PDAs, personal computers, home devices, or the like. Further, while the exemplary embodiment above is presented in terms of interactions between a set top box and a universal remote control, it will be appreciated that many other appliance types, e.g., TVs, PVRs, DVDs, PCs, etc. may be substituted for the set top box without altering the spirit of the invention. Accordingly, it will be understood that the particular arrangements and procedures disclosed are meant to be illustrative only and not limiting as to the scope of the invention which is to be given the full breadth of the appended claims and any equivalents thereof.

All of the cited patents and patent applications are hereby incorporated by reference in their entirety.

What is claimed is:

1. A method for upgrading a device having a universal controlling application, comprising:
    storing in a memory of a master, universal remote controlling device a library of command code sets wherein the library of command code sets includes data that is used by the master, universal remote controlling device to transmit commands directly to various types of appliances of various different manufacturers;
    storing in a memory of an appliance a library of command code sets wherein the library of command code sets includes data that is used by the appliance to transmit commands directly to various types of appliances of various different manufacturers;
    determining if a time stamp provided to the library of command code sets stored in the memory of a master, universal remote controlling device has a time stamp that is later than a timestamp provided to the library of command code sets stored in the memory of the appliance to be commanded using the device having the universal controlling application;
    when the time stamp provided to the library of command code sets stored in the memory of the master, universal remote controlling device is later than the timestamp provided to the library of command code sets stored in the memory of the appliance determining which command code sets in the library of command code sets stored in the memory of the master controlling device are omitted from the library of command code sets stored in the memory of the appliance; and
    transferring from the master, universal remote controlling device to the device having the universal controlling application for storage in the memory of the device having the universal controlling application as a library of command code sets those command code sets in the library of command code sets stored in a memory of the master controlling device that were determined to have been omitted from the library of command code sets stored in the memory of the appliance.

2. The method as recited in claim 1, wherein an identifier indicative of the time stamp provided to the library of command code sets stored in the memory of the appliance is received into the master, universal remote controlling device.

3. The method as recited in claim 2, where the identifier is received by reading a barcode associated with the appliance.

4. The method as recited in claim 2, wherein the identifier is received from a RFID tag associated with the appliance.

5. The method as recited in claim 2, wherein the identifier is included in a communication received from the appliance.

6. The method as recited in claim 2, comprising transferring from the device having the universal controlling application to the appliance those command code sets in the library of command code sets stored in a memory of the master, universal remote controlling device that were transferred to the device having the universal controlling application from the master controlling device.

* * * * *